H. Bachman

Extension Table.

No. 88,433.  Patented Mar. 30, 1869.

Witnesses.

Inventor
Henry Bachman
Alexander & Mason
Attys

HENRY BACHMAN, OF PHILADELPHIA, PENNSYLVANIA.

Letters Patent No. 88,433, dated March 30, 1869.

IMPROVED EXTENSION-TABLE.

The Schedule referred to in these Letters Patent and making part of the same.

*To all whom it may concern:*

Be it known that I, HENRY BACHMAN, of Philadelphia, in the county of Philadelphia, and in the State of Pennsylvania, have invented certain new and useful Improvements in Extension-Table; and do hereby declare that the following is a full, clear, and exact description thereof, reference being had to the accompanying drawings, and to the letters of reference marked thereon.

The nature of my invention consists in the construction and arrangement of a "drop-leaf extension-table," which will be hereinafter fully set forth.

In order to enable others skilled in the art to which my invention appertains, to make and use the same, I will now proceed to describe its construction and operation, referring to the annexed drawings, which form a part of this specification, and in which—

Figure 1:
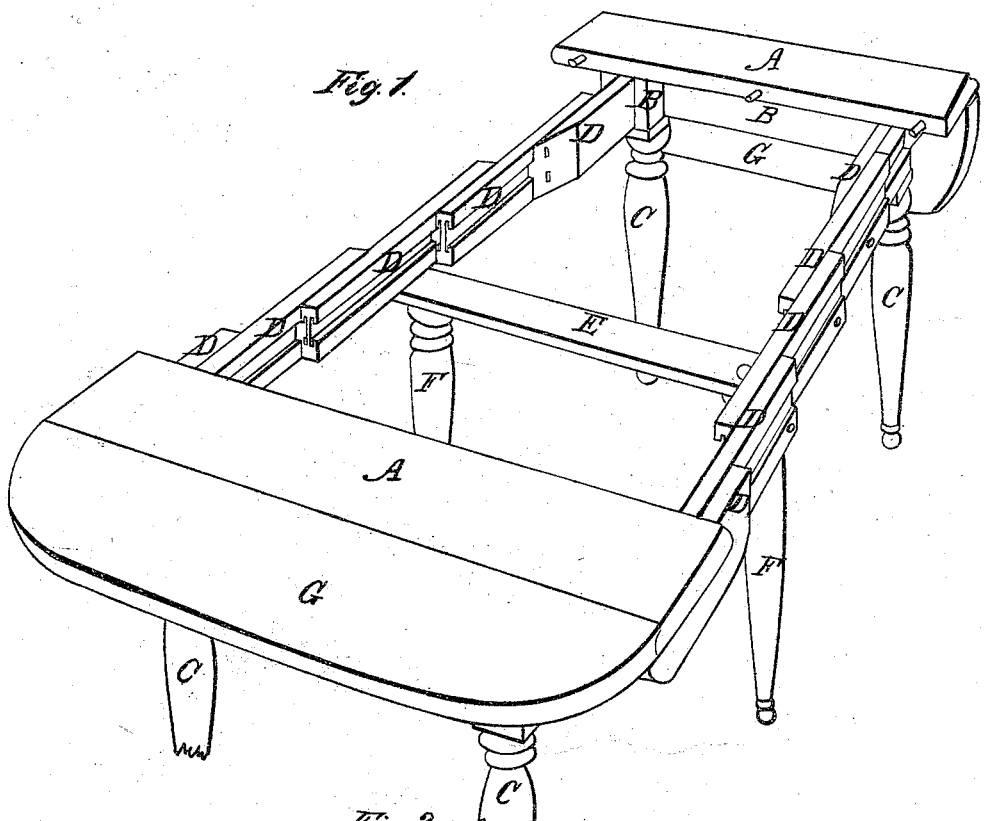

Figure 1 is a perspective view, and

Figure 2:
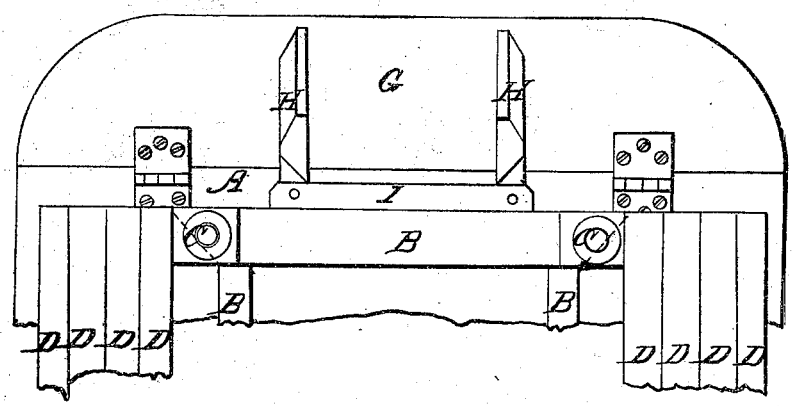

Figure 2, a bottom view.

In all extension-tables heretofore made, the slides have been placed inside the frame which supports the table, and in such cases the table cannot be extended as far as it might if the slides were placed on the outside of the frame.

By placing the slides on the outside of the frame, a less number of slides is necessary to extend the table the same distance, or by using the same number of slides, the table will be extended a greater distance, as the slides can be made longer than if placed inside the frame.

A represents the table, on the under side of which the frame B is secured, said frame resting on legs C C.

D D represent the slides, which are made in any of the known and usual ways, but placed on the outside of the frame B, and extend to the outer edges of the same.

E is the cross-bar, with the two centre-legs F F, which cross-bar is secured to two of the slides, in such a manner that the legs F F will be under the centre of the table, both when the table is shut and open.

The table A is provided with two hinged leaves, G G, which, when raised, are each supported by two brackets, H H, hinged to a bar, I, secured to the side of the frame B, as shown in fig. 2.

Connected under each side of the stationary table-leaves A, of one end of the table, and extending outward from the same, is a stationary guide-board, D', which is made of the same material, and finished similarly to the leaves of the table and other exposed parts thereof, so that when the slides are closed in, the table presents a neat and finished appearance from its sides, as well as from its ends or other parts.

Between the boards D' and the frame B, from which depend the legs C, a receptacle, or wide groove is formed, within which the slides D lie when the table is closed.

The table A may be of any shape or size desired.

Having thus fully described my invention,

What I claim as new, and desire to secure by Letters Patent, is—

The extension-table herein described, provided with a frame, B, at each end, and with slides D D, which are arranged outside of the frame, and, when closed, lie in a receptacle formed by said frame B, and the stationary bars D' D', all substantially as herein set forth.

In testimony that I claim the foregoing, I have hereunto set my hand, this 1st day of February, 1869.

H. BACHMAN.

Witnesses:
WILLIAM MAST,
GEORGE MOORE.